April 21, 1931.   G. S. WRIGHT   1,802,131
COMBINED LEVEL AND PROTRACTOR
Filed Aug. 13, 1928
Fig. 1.
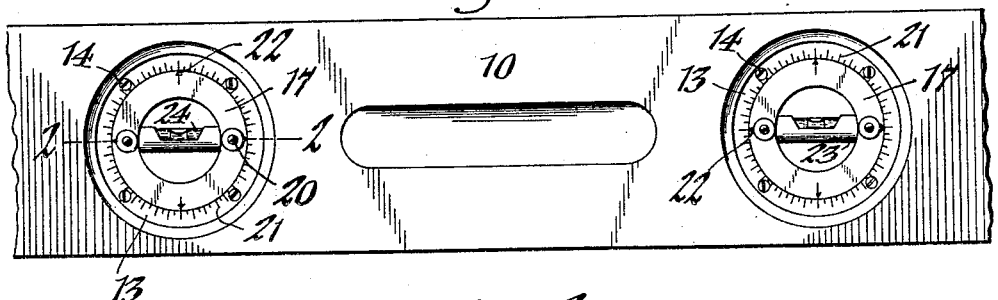
Fig. 2.
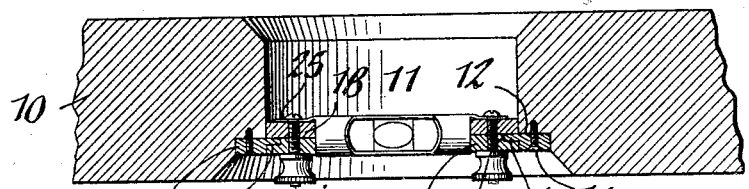
Fig. 4.   Fig. 5.   Fig. 3.
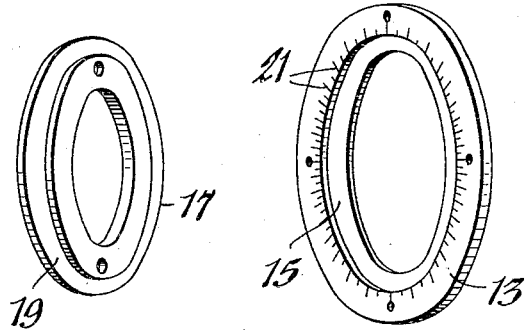 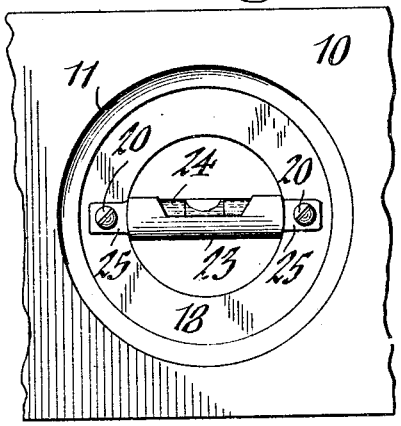
Fig. 6.
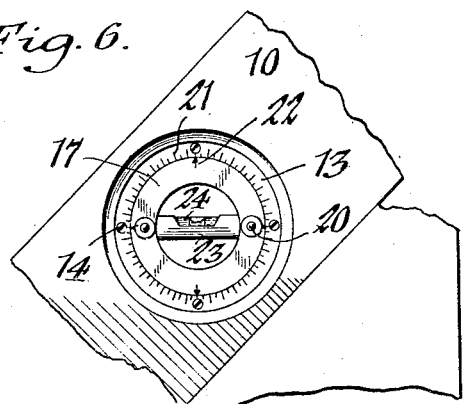
Inventor,
Gilbert Stanley Wright,
by Walter P. Geyer
Attorney.

Patented Apr. 21, 1931

1,802,131

UNITED STATES PATENT OFFICE

GILBERT STANLEY WRIGHT, OF BUFFALO, NEW YORK

COMBINED LEVEL AND PROTRACTOR

Application filed August 13, 1928. Serial No. 299,155.

This invention relates generally to improvements in levels but more particularly to a combined level and protractor.

Its chief object is the provision of a simple and reliable device of this character which is designed to measure the level or plumb of a wall and also to indicate the angularity of a given surface.

Another object of the invention is to provide a combined spirit level and protractor which is readily adjustable, which is frictionless, and which has means for firmly locking the indicating member in a set position.

In the accompanying drawings:—

Figure 1 is a fragmentary face view of a level embodying my invention. Figure 2 is an enlarged fragmentary horizontal section on line 2—2, Figure 1. Figure 3 is a fragmentary rear view of the level. Figures 4 and 5 are perspective views of the companion revolving and stationary rings of the level, respectively. Figure 6 is a fragmentary side view of the level applied to an inclined plane.

Similar characters of reference indicate corresponding parts throughout the several views.

This improved level and protractor comprises a body or stock 10 constituting a straight edge and is provided therein with one or more chambers 11 for receiving the operating elements of the device. Two of such chambers have been shown in the drawings, one on either side of the center of the stock, but it is to be understood that one may be employed, if desired, located centrally of the stock.

Seated in an annular recess 12 in the front side of the chamber 11 is a stationary outer member or bearing ring 13 secured thereto by screws 14 or other appropriate fastenings and having in its front side and along its inner marginal edge an annular recess 15 forming a bearing-flange 16. Rotatably mounted on this flange is a revolving spirit level carrier composed of companion front and rear rings 17 and 18, respectively, the front ring having an annular groove 19 in its rear side and at its outer marginal edge which engages the front side of the bearing flange 16, while the rear ring 18 bears against the opposite side of said flange in the manner shown in Figure 2. These rings are clamped as a unit about the bearing-flange 16 by one or more bolts 20 which permit the carrier to rotate freely within the outer bearing ring 13 and which also serve, when tightened, to hold the carrier rigidly in a set position. As seen in Figure 1, the stationary ring 13 has radial graduations 21 on its front side, while the front carrier-ring 17 has diametrically-disposed pointers or indicators 22 adapted to register therewith for indicating the angularity of a given surface.

Detachably mounted on the carrier-rings 17, 18 and disposed diametrically across the same is the spirit level, preferably consisting of a hollow support or holder 23 in which is arranged a spirit tube 24. The ends of the tube support have laterally-offset attaching flanges 25 which overlap the rear side of the ring 18 and are securely fastened thereto by the clamping bolts 20. Should the spirit tube become broken, it can be quickly replaced by simply detaching its holder 23 from the carrier.

When using the device for measuring the level or plumb of a wall the nuts of the clamping bolts 20 are tightened to rigidly hold the spirit level carrier in the normal position indicated in Figure 1. When it is desired to use the device as a protractor, the nuts of the clamping bolts are loosened sufficiently to permit the spirit level carrier 17, 18 to freely revolve in its bearing ring 13 and assume a position to indicate the degree of slope or angle of a given surface, as seen in Figure 6.

This improved tool, while manifestly simple, compact and inexpensive in construction, is easy to operate and in addition to its use as a level, it can be adjusted for use as a protractor and to this end is very useful in construction work of all kinds.

While I have illustrated and described what I consider to be the preferred embodiment of my invention, it is to be understood that the tool may be modified as to the construction and arrangement of its parts without departing from the spirit of the invention.

I claim as my invention:—

A device of the character described, comprising a stock, a bearing ring secured thereto, a spirit level carrier revolvably mounted on said bearing ring and including a pair of rings, a spirit level mounted on the carrier, and unitary means for fastening said level to said carrier and for clamping the rings of the latter to opposite sides of the bearing ring.

GILBERT STANLEY WRIGHT.